United States Patent [19]
Penick

[11] 3,747,492
[45] July 24, 1973

[54] CAMERA SHUTTER AND FLASHLAMP IGNITING SYSTEM

[75] Inventor: Ib Penick, Wheeling, Ill.

[73] Assignee: Simpro Corporation of America, Englewood Cliffs, N.Y.

[22] Filed: Feb. 25, 1972

[21] Appl. No.: 229,355

[52] U.S. Cl. .................. 95/11.5 R, 95/11 L, 95/55
[51] Int. Cl. ............................................. G03b 9/70
[58] Field of Search ...................... 95/11.5 R, 11 L, 95/55, 53 R, DIG. 1

[56] References Cited
UNITED STATES PATENTS
3,628,431 12/1971 Irwin ............................... 95/11.5 R Primary Examiner—Richard L. Moses
Attorney—Samuel J. Stoll et al.

[57] ABSTRACT

A shutter and flashlamp igniting system for cameras adapted for use with percussion-ignitable flashlamps, comprising a unitary spring-biased shutterblade and firing pin combination which is manually movable in one direction through a camera aperture opening position to a cocked, spring-loaded position, and which is movable in the opposite direction, by loaded spring action, through said camera aperture opening position to expose a film and, synchronously therwith, to ignite a flashlamp. A second shutterblade is provided to close the camera aperture, while the unitary shutterblade and firing pin combination passes through camera aperture opening position to cocked position, to prevent double film exposure.

18 Claims, 15 Drawing Figures

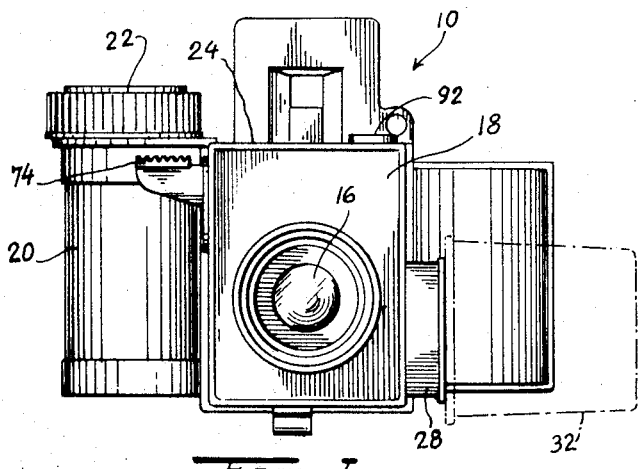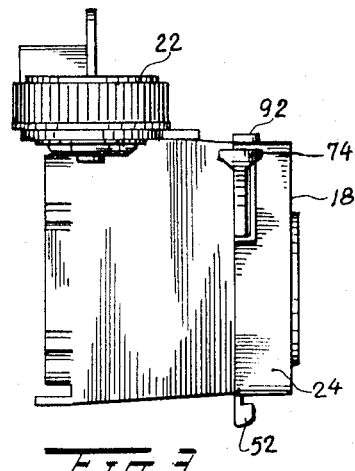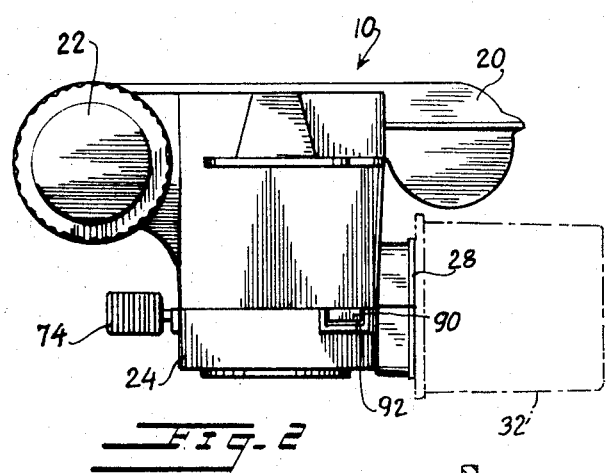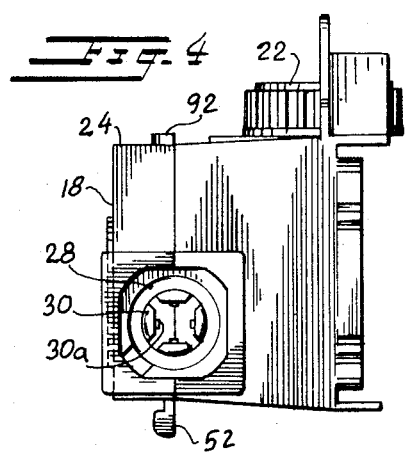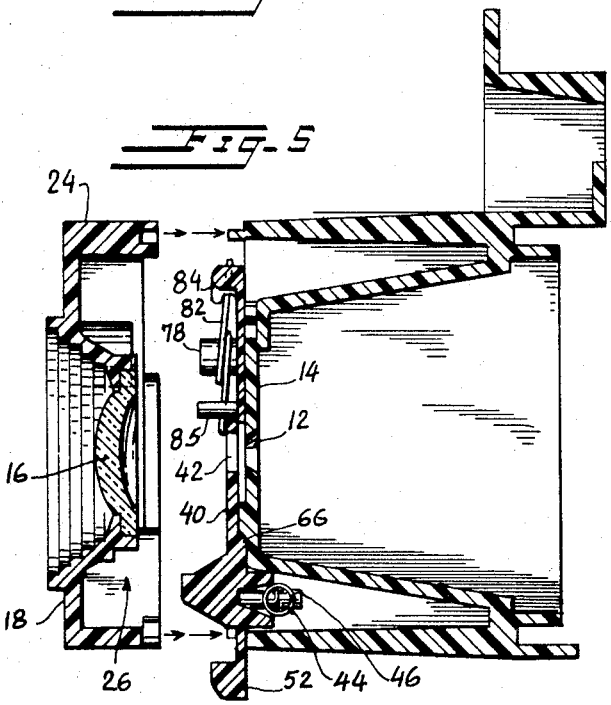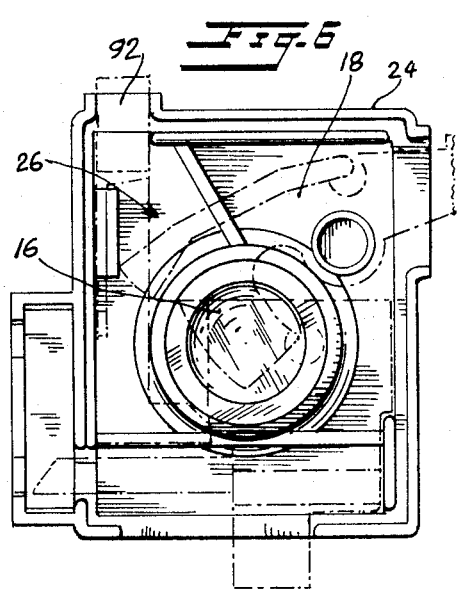

CAMERA SHUTTER AND FLASHLAMP IGNITING SYSTEM

REFERENCE TO RELATED DOCUMENT

Disclosure Document U.S. Pat. No. 6864, filed Oct. 6, 1971, relates to the present invention.

BACKGROUND OF THE INVENTION

1. Field of the Invention

This invention relates to cameras which are adapted to use percussion-ignitable flash-lamps.

2. Description of the Prior Art

The closest prior patent art known to applicant is represented by the following U.S. Pats. and references cited therein:

William T. Colville No. 3,528,353
Chester W. Michatek No. 3,576,156
Donald M. Harvey No. 3,584,556

Existing systems, as exemplified by these patents, are complicated and costly. They consist of separate assemblies of parts which are interconnected mechanically and functionally. For example, they have separate shutter, ignition and hammer mechanisms which are synchronously interconnected, as well as interconnected flashcube advancing (rotating) means.

A common principle permeates all known systems. A strong mainspring is loaded when the film is advanced or, in the case of cameras which do not use roll film, e.g., Polaroid, a strong mainspring is loaded by trigger action. In either case, the loaded mainspring powers a hammer which operates both the shutter mechanism and the flashlamp igniting system. As an illustration, in one case the hammer trips a spring-biased shutterblade and thrusts it into open position to expose the film. The shutterblade moves back into closed position the moment the hammer passes by. The hammer also strikes a firing pin and causes it to engage and actuate the ignition system of a flashlamp.

The interconnecting mechanisms are elaborate in order to maintain exact synchronization between exposure of the film and ignition of the flashlamp. Since ignition normally precedes exposure by milliseconds, there is little time tolerance between these operations. In some cases a delay mechanism in the firing system slows the shutter operation down when a flashlamp is used, for example, from 0.125 to 0.090 of a second.

Conventional flashlamps are made in the form of flash-cubes (four flashlamps per cube) and a mechanism is provided for sequentially rotating the cube in synchronization with the film exposing and flashlamp igniting operations. In some instances the firing pin is prevented from operating in the absence of a flashcube, in other instances warning flags are provided to signal a spent flashlamp.

In all cases a series of complicated, interconnected mechanisms is provided, consisting of some 30 to 50 separate component parts.

SUMMARY OF THE INVENTION

It is an important object of this invention to provide a shutter and flashlamp igniting system which is simple in mechanism and operation, comprising relatively few component parts which are easily and quickly assembled, and relatively inexpensive in terms of materials and labor.

It is also an important object of the invention to provide a shutter and flashlamp igniting system which is relatively foolproof in operation in the hands of both skilled and unskilled photographers.

The present invention provides a low-cost system which is intended for incorporation into a low-cost camera, e.g., a box camera.

More particularly, a shutter and flashlamp igniting system in accordance with the present invention consists of only three spring-biased parts which, in conjunction with the camera proper, perform two basic functions: (a) exposure of film, and (b) ignition of a flashlamp in synchronization therewith. One of these three spring-biased parts is a shutterblade combined with a firing pin and a reset handle. The second is a sear lock which engages and holds the shutterblade-firing pin-reset handle component in cocked, spring-loaded position. The third part is a second shutterblade combined with a trigger and a sear retractor which is engageable with the sear lock to release it from the shutterblade-firing pin-reset handle component. The two shutterblades are arranged in overlapping relationship in parallel planes. The function of the first shutterblade is to expose the film; the function of the second shutterblade is to prevent double exposure of the film. The function of the firing pin is to ignite a flashlamp either concurrently with exposure of the film or in advance thereof. The length of the firing pin, the length of its stroke, and its distance from the flashlamp determine the time of ignition in relation to the time of exposure, but in all cases there is complete synchronization of ignition and exposure since the shutter and firing pin are integral with each other and move integrally with each other.

BRIEF DESCRIPTION OF THE DRAWING

FIG. 1 is a front view of a camera embodying the present invention.

FIG. 2 is a top view thereof.

FIG. 3 is an end view.

FIG. 4 is an opposite end view.

FIG. 5 is an exploded vertical section through said camera.

FIG. 6 is an inside view of the lens-carrying component.

DESCRIPTION OF PREFERRED EMBODIMENTS OF INVENTION

Figure 7:
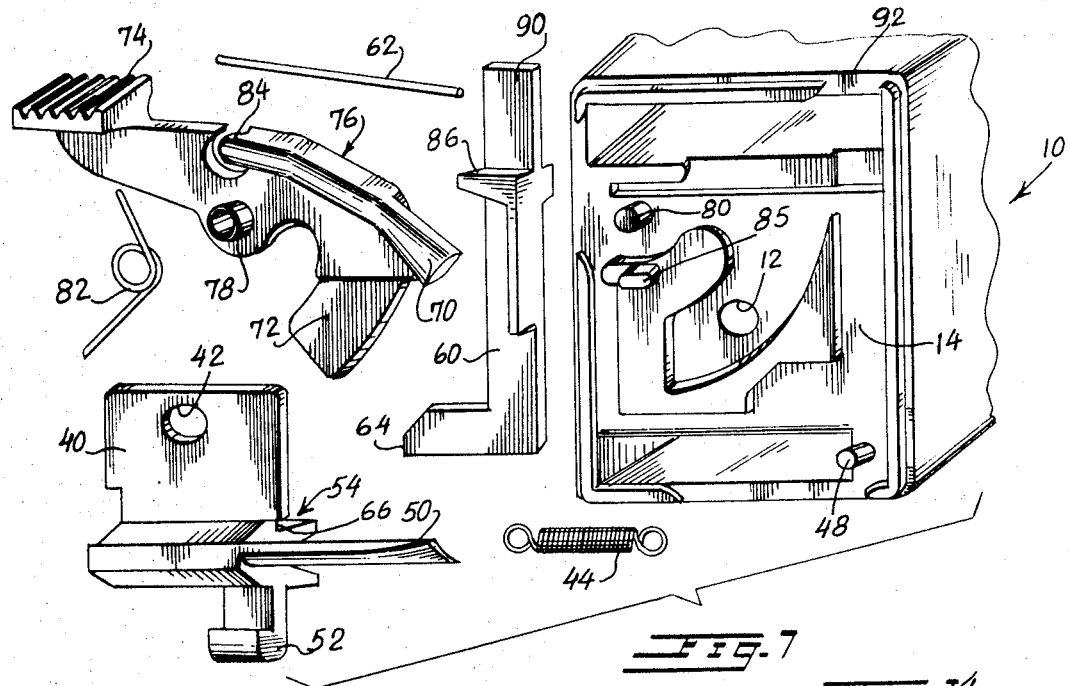
FIG. 7 is an exploded view of the several parts of the shutter and firing elements of the camera and the camera component which supports them.

The present invention is applied, primarily, to a box camera such as camera 10 shown FIGS. 1–6 of in the drawing. This camera has an aperture 12 formed in an inner wall 14 and a lens 16 is mounted in an outer wall 18 coaxially with said aperture 12. It is through aperture 12 (and through the lens) that the film is exposed. For purposes of illustration, a film cartridge 20, such as the Instamatic film cartridge of Eastman Kodak Company, is shown mounted on camera 10 opposite walls 14 and 18 above mentioned. A knob 22 is provided on the camera to engage the film cartridge and advance the film.

It will be noted that inner wall 14 is recessed, somewhat, into the camera box and that outer wall 18 is formed on an extension piece 24, thereby providing a compartment 26 between the two walls. It is within said compartment that the component parts of the present invention are lodged.

Figure 8:
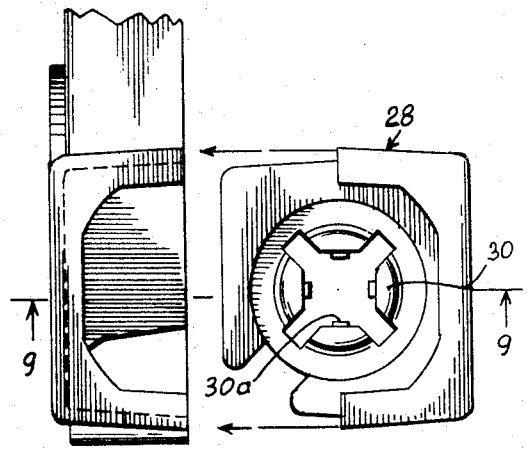
FIG. 8 is an exploded view of the flashcube holder.
Figure 9:
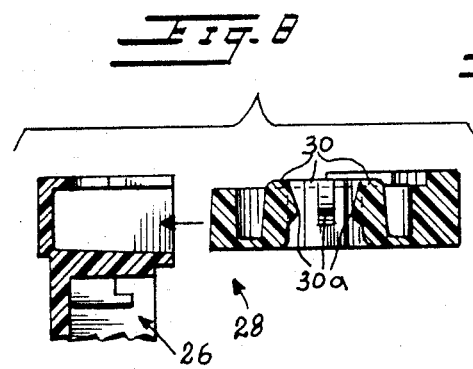
FIG. 9 is a sectional view on the line 9—9 of FIG. 8.

Flashcube holder 28, (FIGS. 8, 9) mounted on extension piece 24, is provided with four spring clip fingers 30 to hold a flashcube 32 in operative position on the flashcube holder. Fingers 30 are provided with cam-faced embossments 30a for snap-in engagement with complementary recesses or notches in the cube base. Extension piece 24, its spring clip fingers 30 and their cam-faced embossments 30a comprise a single plastic molding. The flashcube is manually removed from holder 28 and then rotated and replaced in said holder to position each of its four flashlamps in operable location.

The details of the shutterblade and firing system, as shown in FIGS. 7 and 10–13, will now be discussed. Slidably mounted in compartment 26, for movement toward and away from flashcube holder 28, is the main shutterblade 40. The common axis of camera aperture 12 and camera lens 16 is perpendicular to the plane of movement of said shutterblade 40. It will be seen that the shutterblade has an aperture 42 formed therein, and it will be understood that transitory registration of said shutter aperture 42 with camera aperture 12 will occur when the shutterblade is moved in either direction with respect to the flashcube holder.

As is above indicated, shutterblade 40 is spring-biased toward the flashcube holder and spring 44 is the biasing element. At one end it is attached to a stud 46 on the shutterblade; at the opposite end it is attached to a stud 48 on the camera box.

Integrally connected with shutterblade 40 is firing pin 50. This firing pin projects outwardly from the shutterblade in line with its path of movement. When the shutterblade moves in one direction, the firing pin clears the flashcube holder; when the shutterblade moves in the opposite direction, the firing pin enters the flashcube holder and engages one of the flashlamps, thereby igniting it.

Also integrally connected with shutterblade 40 is a reset handle 52. It is by means of this handle that the shutterblade is moved away from the flashcube holder to load spring 44 and to cock the shutterblade as well as its firing pin. Shutterblade 40, firing pin 50 and reset handle 52 are all combined in an integrally molded unitary body 54.

Slidably movable transversely of the path of movement of the shutterblade is a sear lock 60. A spring 62 urges the sear lock into the path of the shutterblade and, when the shutterblade is retracted manually by means of the reset handle (that is, moved away from the flashcube holder) the sear lock engages the shutterblade and blocks it from moving in the opposite direction (toward the flashcube holder). Specifically, sear lock 60 as an integer detent 64 which is engageable with an integral offset 66 of the shutterblade, and it is when the shutterblade is in retracted (cocked) position that said detent 64 engages offset 66 and holds the shutterblade against the bias of spring 44.

Sear lock 60 must be retracted in order to release shutter-blade 40 for spring-thrust movement in the direction of the flashcube holder. A sear retractor is accordingly provided in the form of an extension piece 70 on a second shutterblade 72. Also connected with said second shutterblade is a trigger 74. The sear retractor 70, the second shutterblade 72 and the trigger 74 are all combined in an integrally molded unitary body 76.

It will be observed FIGS. 7 and 10–13 that a bushing 78 is formed on unitary body 76 to receive stud 80 on camera wall 14. Unitary body 76 pivots on said stud 80 and a torsion spring 82 on said stud applies spring bias to said unitary body to urge it in clockwise direction as viewed in the drawing. More particularly, one end of torsion spring 82 bears against pin 84 on the unitary body 76 and the opposite end of the spring bears against a pin 85 on camera wall 14.

A lug 86 is formed on sear lock 60 and it will be understood that said lug and detent 64 are integrally molded with the sear lock 60 proper in a unitary body. Sear retractor 70 is engageable with lug 86 in lost-motion relationship. Where unitary body 76 (sear retractor 70, shutterblade 72, trigger 74) is in spring-biased position, sear retractor 70 is not in contact with lug 86, and the sear lock is free to move, under the bias of its spring 62, into engagement with unitary body 54 (shutter-blade 40, firing pin 50, reset handle 52, offset 66). When trigger 74 is manually depressed against the action retractor torsion spring 82, sear retracted 70 is moved into engagement with said lug 86 and detent 64 is thereby pulled out of engagement with offset 66 of unitary body 54. See FIGS. 7 and 11

This releases unitary body 54 for spring-thrust movement in the direction of the flashcube holder, and firing pin 50 thereby strikes a flashlamp in flashcube 32 to ignite the flashlamp. As unitary body 54 moves toward the flashcube holder, shutter-blade aperture 42 is brought into momentary registration with camera aperture 12 and lens 16 to expose a film. Such exposure is possible because shutterblade 72, which normally covers the camera aperture, is moved away from said aperture to open same when the trigger is manually actuated. see FIGS. 11 and 12

Shutterblade 72 also functions to prevent double exposure of film when shutterblade 40 is retracted to cocked, spring-loaded position. This movement of shutterblade 40 brings its aperture 42 into registration with camera aperture 12 and lens 16. However, shutterblade 72 is, at this time, superimposed across said camera aperture 12 and exposure of the film is thereby prevented.

It is evident from the foregoing (and from FIGS. 10–13 of the drawing) that the two shutterblades 40 and 72 are disposed in overlapping relationship and movable in parallel planes which intersect the lens and camera aperture axis at right angles. The main shutterblade which functions as the camera shutter is shutterblade 40. The secondary or back-up shutter is shutterblade 72, whose function is to close the camera aperture and to allow the main shutterblade 40 to move across the camera aperture to cocked position without exposing the film.

A useful element in the present invention is warning flag 90 at the upper end of the sear lock 60, integral therewith. When the sear lock is retracted, that is, when it is not positioned in blocking engagement with offset 66 of shutterblade 40, warning flag 90 will project outwardly from the camera box through slot 92. See FIG. 13 This will indicate that shutterblade 40 and firing pin 50 are not in cocked, spring-loaded position and that the camera is not ready to take a picture. When reset handle 52 is manually actuated to move shutterblade 40 and firing pin 50 into cocked, spring-loaded position, the sear lock will be spring-thrust into engagement with offset 66 of said shutterblade 40 to hold said shutterblade and its firing pin 50 in said position. Flag 90 will now be retracted into the camera box and this will signal the fact that the camera is cocked and ready for action. See FIG. 13

Figure 14:
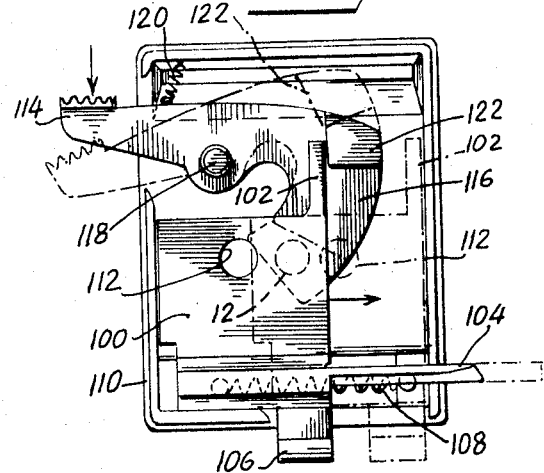
FIG. 14 is a view similar to that of FIG. 10 but showing a second embodiment of the invention.

A second embodiment of the invention is shown in FIG. 14 The inventive principle remains the same; only the design of the operative parts is changed.

More particularly, shutterblade 100 (which corresponds to shutterblade 40 of the first form of the invention) is provided with an upright rounded stud 102, in addition to firing pin 104 and reset handle 106. A spring 108 interengages shutterblade 100 with an anchorage on the camera box 110 to bias the shutterblade forwardly, that is, in the direction of the flashcube holder 28. The shutterblade has an aperture 112 formed therein (corresponding to aperture 42 in shutterblade 40), for momentary registration with the camera aperture 12 and lens 16 in order to expose a film.

Trigger 114 in the second embodiment of the invention (corresponding to trigger 74) has a curved shutterblade 116 connected therewith (corresponding to shutterblade 72), and it will be seen that the trigger is pivotally mounted on stud pin 118 for movement of said shutterblade into and out of closed (covering) position relative to said camera aperture. A torsion spring 120 engages the trigger and biases it in clockwise direction as viewed in the drawing. Sear element 122, which is formed and projects from trigger 114, is engageable with stud 102.

It will be understood that there are only two spring-biased, plastic-molded parts in the second form of the invention, the first consisting of shutterblade 100, stud 102, firing pin 104 and reset handle 106, and biased by spring 108, and the second consisting of trigger 114, shutterblade 116 and sear element 122, and biased by spring 120.

In the operation of this device, reset pin 106 is manually moved leftwardly, as viewed in the drawing, until stud 102 engages sear element 122. This movement results in loading spring 108 and cocking shutterblade 100 in closed position relative to camera aperture 12. When the trigger is depressed (pivoted in counterclockwise direction as viewed in the drawing) its torsion spring 120 will be loaded, its shutterblade 116 will clear (open) camera aperture 12, and its sear element 122 will clear (disengage) stud 102, thereby freeing shutterblade 100, together with its firing pin 104, for forward spring-thrust movement in the direction of the flashcube holder. The firing pin will engage a flashlamp (if there be one in the flashcube holder) and cause it to ignite. The shutterblade aperture 112 will momentarily register with camera aperture 12 to expose a film, and said camera aperture will be closed (covered) by the shutterblade when the latter reaches its position of rest at the conclusion of the operation.

Trigger 114 may be held (or placed) in depressed (actuated) position until shutterblade 100 and firing pin 104 are reset in cocked, spring-loaded position, whereupon release of the trigger will enable its loaded torsion spring to swing it back in counterclockwise direction to enable its sear flange 122 to re-engage stud 102 of shutterblade 100. Alternatively, said stud will slip over said sear flange when the trigger is released and said shutterblade 100 is reset.

Figure 15:
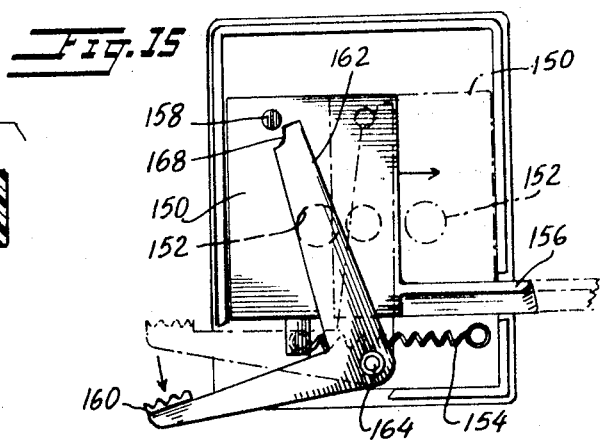
FIG. 15 is still another view similar to that of FIG. 10, but showing a third embodiment of the invention.
Figure 10:
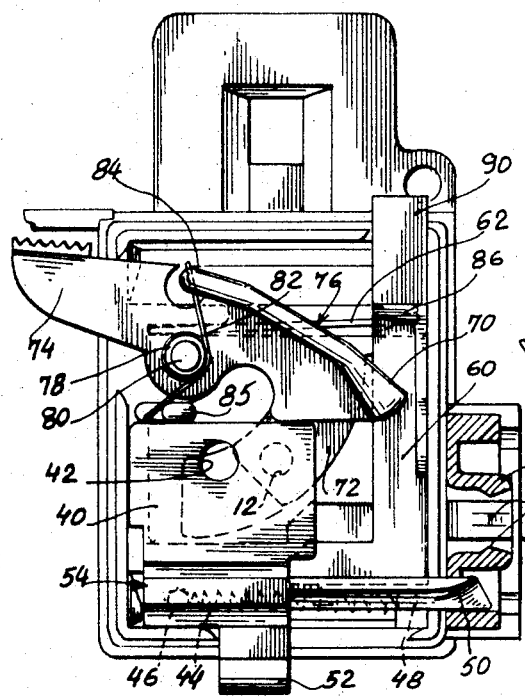
FIG. 10 is a view of the assembled shutter and firing mechanism, shown in cocked position.
Figure 11:
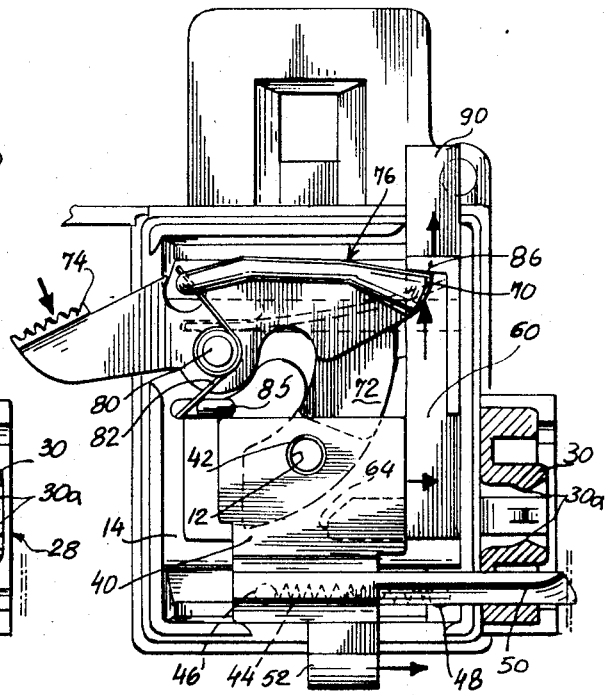
FIG. 11 is a similar view, showing said mechanism in action following actuation of the trigger, the shutter being shown in film-exposing position and the firing pin in percussion engagement with a flashlamp.
Figure 12:
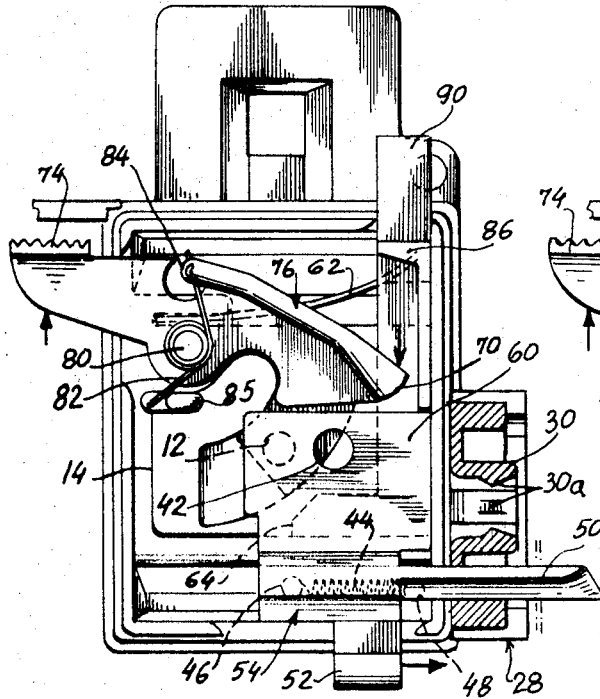
FIG. 12 is still another view of the shutter and firing mechanism, said mechanism being shown following exposure of film and firing of the flashlamp.
Figure 13:
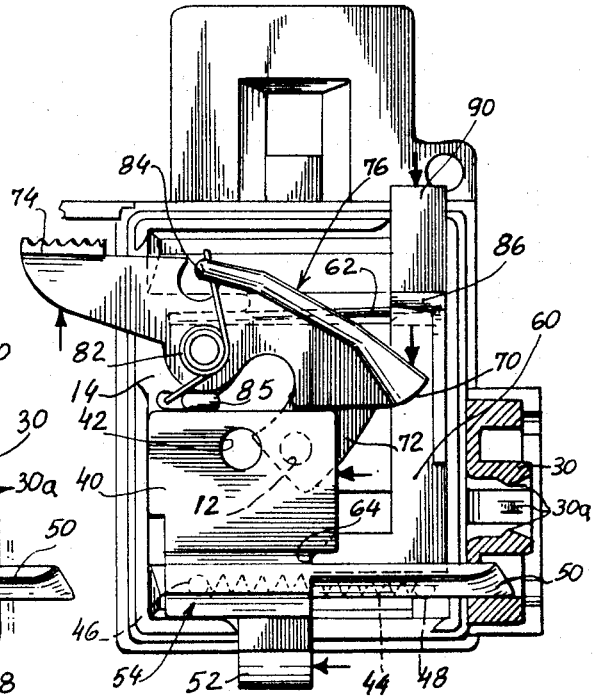
FIG. 13 is still another view of said shutter and firing mechanism showing it moved into cocked position.

A third embodiment of the invention is illustrated in FIG. 15 Once again, the inventive principle remains the same; only the design is changed.

In the third form of the invention, shutterblade 150 corresponds to shutterblade 40 and aperture 152 in shutter-blade 150 corresponds to aperture 42 in shutterblade 40. Spring 154 biases shutterblade 150 toward the flashcube holder (toward the right as viewed in the drawing). Connected with shutterblade 150 are firing pin 156 (corresponding to firing pin 50) and rounded shutter drive pin z58.

Trigger 160 in the third form of the invention is connected with shutterblade 162 (corresponding, respectively, to trigger 74 and shutterblade 72), and it will be seen that trigger 160 is pivotally mounted on pivot pin 164. Engaging the trigger is torsion spring 166 which biases the trigger in clockwise direction as viewed in the drawing. A cam-faced endpiece 168 is formed at the free end of shutterblade 162 for engagement with drive pin 158.

As is the case with the second form of the invention, the third form consists of two plastic molded, spring-biased parts, namely, one part comprising shutterblade 150, firing pin 156 and drive pin 158, and the other part comprising trigger 160 and shutterblade 162.

In the operation of the third form of the invention, trigger 160 is manually depressed and caused to pivot in counterclockwise direction (as viewed in the drawing) about pivot pin 164. Shutterblade 162 is thereby caused to clear (uncover) the camera aperture 12 in preparation for exposure of a film. At the same time, the camfaced endpiece 168 of said shutterblade 162 engages drive pin 158 and drives said pin leftwardly (as viewed in the drawing), together with shutterblade 150 and firing pin 156, thereby loading spring 154.

It will now be noted that trigger 160 and shutterblade 162 define a bellcrank, and as the trigger is depressed downwardly the shutterblade swings leftwardly, both moving arcuately about pivot pin 164. Torsion spring 166 will now be loaded. Such arcuate movement of the shutterblade will bring the cam-faced endpiece to a point where it will disengage drive pin 158, thereby freeing it, together with shutterblade 150 and firing pin 156, for forward movement responsive to the action of the loaded spring 154. The firing pin will engage and ignite a flashlamp in the flashcube holder 28 and the shutterblade aperture 152 will momentarily register with the camera aperture 12 and camera lens 16 to expose a film.

When the trigger is released, its loaded torsion spring 166 will cause the trigger and its shutterblade 162 to pivot in clockwise direction to their original position, the said shutterblade slipping over drive pin 158 to do so.

The foregoing description is illustrative of preferred forms of the invention and it will be understood that these preferred forms may be modified, and other forms provided within the broad scope of the appended claims.

I claim:

1. In a camera adapted for use with percussion ignitable flashlamps:
   a. a spring-biased shutterblade, and
   b. a flashlamp firing pin,
   c. said firing pin being combined with said shutterblade for integral movement therewith.

2. The combination of claim 1, wherein:
   the firing pin is integrally connected with the shutterblade for integral movement therewith.

3. The combination of claim 1, wherein:
   a. the shutterblade is manually movable in a first direction from a first closed position, through an open position, and to a second closed position, to load its spring,
   b. said second closed position of the shutterblade being its cocked position,
   c. said shutterblade being movable in reverse direction, by loaded spring action, from said second closed position, through said open position, and to said first closed position, to expose a film,
   d. said open position of the shutterblade being its film exposing position when moved in said reverse direction,
   e. said firing pin being an integral extension of the shutterblade and integrally movable therewith in said first direction to a cocked position corresponding to the cocked position of the shutterblade,
   f. said firing pin being also integrally movable with said shutterblade in said reverse direction to a flashlamp-percussion position functionally related to the film exposing position of the shutterblade,
   g. whereby a flashlamp is ignited by the firing pin in conjunction with the exposure of a film by the shutterblade.

4. The combination of claim 3, wherein:
   a. the flashlamp-percussion position of the firing pin corresponds to the film exposing position of the shutterblade,
   b. whereby spring-urged movement of the shutterblade in said reverse direction causes concurrent exposure of a film and ignition of a flashlamp when the shutter-blade passes through its said open position.

5. The combination of claim 3, wherein:
   a. the flashlamp-percussion position of the firing pin precedes the film-exposing position of the shutterblade,
   b. whereby spring-urged movement of the shutterblade in said reverse direction causes ignition of a flashlamp and exposure of a film, the former in advance of the latter.

6. The combination of claim 3, wherein:
   a. the shutterblade is provided with manually actuable reset means for moving it in said first direction to its second closed position to load its spring,
   b. a sear lock being provided to hold said shutterblade in said second closed position, and
   c. sear release means being provided for releasing the sear lock from the shutterblade and thereby freeing said shutterblade, together with its firing pin, for spring-urged movement in said reverse direction,
   d. thereby enabling the shutterblade to expose a film and the firing pin to ignite a flashlamp.

7. The combination of claim 3, wherein:
   a. a second spring-biased shutterblade is provided for movement into and out of a closed position coinciding with the open position of the first-mentioned shutterblade,
   b. said second shutterblade being movable into its said closed position to prevent film exposure when the first-mentioned shutterblade passes through its said open position during its movement in the first-mentioned direction,
   c. said second shutterblade being movable out of its said closed position to allow film exposure when the first-mentioned shutterblade passes through its said open position during its movement in said reverse direction.

8. The combination of claim 7, wherein:
   a. a sear lock is provided between the first and second shutterblades,
   b. said sear lock being engageable with the first shutterblade to hold it in cocked position,
   c. said sear lock being retractable by the second shutterblade from engagement with the first shutterblade.

9. The combination of claim 8, wherein:
   a. the sear lock comprises a spring-biased, slidably movable element,
   b. said sear lock being movable under spring bias into locking engagement with the first-mentioned shutterblade when said shutterblade is in cocked position,
   c. said second-mentioned shutterblade having a sear lock retracting element connected therewith which engages and retracts the sear lock from engagement with the first-mentioned shutterblade.

10. The combination of claim 8, wherein:
    a. the sear lock comprises a sear element formed on the second shutterblade,
    b. a sear engaging element being formed on the first shutterblade for engagement with said sear element when said first shutterblade is in cocked position.

11. The combination of claim 7, wherein:
    a. a trigger is connected to said second shutterblade to actuate same,
    b. whereby the second shutterblade is manually movable against its spring action into its said open position, and
    c. whereby the second shutterblade is movable by spring action into its said closed position.

12. The combination of claim 11, wherein:
    a. the first-mentioned shutterblade is provided with manually actuable reset means for moving it in said first direction to its spring-loaded cocked position,
    b. a sear lock being provided for engagement with said first-mentioned shutter-blade to lock said first-mentioned shutterblade in its said spring-loaded cocked position,
    c. said second shutterblade having sear release means connected therewith for releasing the sear lock from said cocked first-mentioned shutter-blade and freeing it, together with its firing pin, for spring-urged movement in said reverse direction, d. thereby enabling the first-mentioned shutterblade to expose a film and the firing pin to ignite a flashlamp.

13. The combination of claim 7, wherein:
a. driving means are provided between the first and second shutterblades, and
b. a trigger is provided on the second shutterblade,
c. whereby actuation of said trigger causes the second shutterblade to drive the first shutterblade against its spring bias to load its spring,
d. said driving means being disengageable from the first shutterblade when the first shutterblade spring is loaded,
e. thereby releasing said first shutter-blade and its firing pin for spring thrust movement to film-exposing and flashlamp-igniting positions.

14. In a camera adapted for use with percussion-ignitable flashlamps, a shutter and flashlamp igniting system comprising:
a. a first spring-biased shutterblade mounted for movement relative to the film exposure aperture of a camera to open and close same,
b. a reset handle combined with said first shutterblade to move same manually to spring-loaded cocked position relative to the camera aperture,
c. a spring-biased sear lock mounted for movement relative to said first shutter-blade to lock same in its said cocked position,
d. a flashlamp firing pin also combined with said first shutterblade for movement therewith relative to a flashlamp carried by the camera to ignite same,
e. a second spring-biased shutterblade overlapping the first shutterblade and mounted for movement relative to the camera aperture to open and close same,
f. a sear retractor combined with said second shutterblade for engagement with the sear lock, and
g. a trigger also combined with said second shutterblade for manual actuation thereof,
h. said first shutterblade being in normally closed position relative to the camera aperture and being movable by the reset handle through open position to cocked closed position,
i. said second shutterblade being in normally closed position relative to the camera aperture to enable the first shutterblade to pass through its open position to cocked closed position without exposing the film,
j. said second shutterblade being movable by said trigger into open position, and said sear retractor being thereby caused to release the sear lock from the first shutterblade,
k. whereby the first shutterblade is spring-thrust through open position to expose the film and the firing pin is spring-thrust into percussion-engagement with the flashlamp to ignite same.

15. A shutter and flashlamp igniting system in accordance with claim 14, wherein:
the first and second shutterblades are movable in parallel planes which intersect the camera aperture axis at right angles.

16. A shutter and flashlamp igniting system in accordance with claim 14, wherein:
the first shutterblade, the reset handle and the flashlamp firing pin are all integral with each other in an integrally movable unit.

17. A shutter and flashlamp igniting system in accordance with claim 14, wherein:
the second shutterblade, trigger and sear retractor are all integral with each other in an integrally movable unit.

18. In a camera adapted for use with percussion-ignitable flashlamps, a shutter and flashlamp igniting system comprising:
a. a first spring-biased shutterblade,
b. a flashlamp firing pin combined with said first shutterblade and movable therewith,
c. reset means connected to said first shutterblade to reset same against its spring bias and thereby load the spring,
d. a spring-biased sear lock engageable with said first shutterblade to hold it in reset position against the action of the loaded first shutterblade spring,
e. a second spring-biased shutterblade, overlapping the first shutterblade, and engaging the sear lock,
f. a trigger combined with said second shutterblade and movable therewith,
g. said second shutterblade being manually movable against its spring bias, by means of said trigger, from closed position to open position, to load its spring and to release the sear lock from the first shutterblade,
h. said second shutterblade being also reversely movable under its loaded spring bias, when the trigger is released, back from said open position to said closed position,
i. said first shutterblade being manually movable against its spring bias, by means of its said reset means, from a first closed position, through open position, to a second closed position, wherein its spring is loaded and it is engaged and held by the sear lock,
j. said first shutterblade being also reversely movable, under its loaded spring bias, when released by the sear lock, from said second closed position, through said open position, and back to said first closed position,
k. the second closed position of the first shutterblade being its cocked position and the cocked position of the firing pin,
l. the open position of said first shutter-blade being its film exposing position, and being also the last possible flashlamp igniting position for the firing pin,
m. whereby the reset means may be manually actuated to move the first shutterblade into cocked position, together with its firing pin, in engagement with the sear lock, and
n. whereby the trigger may be manually actuated to move the second shutterblade to open position and to release the sear lock from the first shutterblade,
o. thereby freeing the first shutterblade for spring-thrust movement through its open position to expose a film, and
p. thereby also freeing the firing pin for spring-thrust movement, with said first shutterblade, into flashlamp igniting position to ignite a flash-lamp and
q. whereby the trigger may be manually released to return the second shutterblade to closed position and release the sear lock for re-engagement with the first shutterblade.

* * * * *